United States Patent
Kim et al.

(10) Patent No.: US 8,614,750 B2
(45) Date of Patent: Dec. 24, 2013

(54) APPARATUS AND METHOD FOR AUTO WHITE BALANCE CONTROL CONSIDERING THE EFFECT OF SINGLE TONE IMAGE

(75) Inventors: Joo Hyun Kim, Gyunggi-Do (KR); Bong Soon Kang, Busan (KR); Sung Mok Lee, Busan (KR); Won Woo Jang, Busan (KR); Kyung Rin Kim, Busan (KR); Won Tae Choi, Gyunggi-Do (KR); Joo Young Ha, Gyunggi-Do (KR)

(73) Assignee: Samsung Electro-Mechanics Co., Ltd., Suwon, Gyunggi-Do (KR)

(*) Notice: Subject to any disclaimer, the term of this patent is extended or adjusted under 35 U.S.C. 154(b) by 650 days.

(21) Appl. No.: 12/588,516

(22) Filed: Oct. 19, 2009

(65) Prior Publication Data

US 2010/0194991 A1   Aug. 5, 2010

(30) Foreign Application Priority Data

Feb. 3, 2009   (KR) .................. 10-2009-0008491

(51) Int. Cl.
*H04N 5/228*   (2006.01)
*H04N 9/73*    (2006.01)

(52) U.S. Cl.
USPC .................. 348/223.1; 348/222.1; 348/655

(58) Field of Classification Search
USPC ........................................... 348/655
See application file for complete search history.

(56) References Cited

U.S. PATENT DOCUMENTS

| 5,278,641 | A | * | 1/1994 | Sekizawa et al. | 358/527 |
| 5,982,926 | A | * | 11/1999 | Kuo et al. | 382/167 |
| 2004/0233317 | A1 | * | 11/2004 | Matsushita | 348/333.02 |
| 2005/0180020 | A1 | * | 8/2005 | Steenblik et al. | 359/626 |

FOREIGN PATENT DOCUMENTS

| KR | 1020080049458 A | | 6/2008 |
| WO | WO2007/026303 | * | 3/2007 |

* cited by examiner

*Primary Examiner* — Jefferey Harold
*Assistant Examiner* — Michael Teitelbaum
(74) *Attorney, Agent, or Firm* — Lowe Hauptman & Ham, LLP

(57) ABSTRACT

An apparatus for auto white balance includes a histogram generation unit writing respective histograms of Cb values and Cr values with regard to pixels included in an input image frame, a single-tone determination unit comparing respective maximum values of the histograms of Cb values and Cr values with a first threshold value, and determining the input image frame as a single-tone image if at least one of the maximum values is higher than the first threshold value, and an auto white balance gain computation unit computing and an auto white balance gain by using color information of an input image frame and outputting the computed auto white balance gain, wherein if the input image frame is determined to be a single-tone image, the auto white balance gain computation unit outputs an auto white balance gain computed with respect to a previous input image frame.

4 Claims, 9 Drawing Sheets
(2 of 9 Drawing Sheet(s) Filed in Color)

APPARATUS AND METHOD FOR AUTO WHITE BALANCE CONTROL CONSIDERING THE EFFECT OF SINGLE TONE IMAGE

CROSS-REFERENCE TO RELATED APPLICATIONS

This application claims the priority of Korean Patent Application No. 10-2009-0008491 filed on Feb. 3, 2009, in the Korean Intellectual Property Office, the disclosure of which is incorporated herein by reference.

BACKGROUND OF THE INVENTION

1. Field of the Invention

The present invention relates to the field of digital image processing, and more particularly, to an apparatus and method for auto white balance control considering the effect of a single tone image, which can prevent erroneous auto white balance by taking into account the influence that a single tone image has on a gain computed for an auto white balance control.

2. Description of the Related Art

The human eye perceives objects as having the same color, even under different light sources. That is, the human eye perceives white as the same white tone even under different light sources with different color temperatures, such as the sun, fluorescent lamps and incandescent lamps. In contrast, image sensors employing solid state imaging devices convert light into electrical signals, thus they detect the color of an object differently depending on the light source illuminating the object. Therefore, most digital image processing devices (e.g., digital cameras) adopt auto white balance (AWB) control algorithms for automatically adjusting white balance in order to render the color of the object, detected by the image sensor, similar to the color perceived by the human eye.

In general, AWB control in digital image processing devices is carried out by representing a white object with a medium brightness level in an image as color signals (i.e., RGB signals) having identical output levels. As for a related art AWB control algorithm in wide use, assuming that the mean color value of an image is the value of white regardless of the variations of light sources, the mean color value is obtained from an image, and then the gain of a color signal level that allows the mean color value to be the value of white is obtained and applied to the image. For example, in the related art AWB control method, the values of Cb and Cr (hereinafter, referred to as 'Cb and Cr values) are integrated and the mean values of the Cb and Cr values are calculated, thus adjusting the gains of red (R) and blue (B). Here, the Cb and Cr values refer to the color difference signals of pixels belonging to an area estimated at white in an input image.

However, those related art techniques for an AWB control have limitations, in that a single tone in an image affects the process of computing a white balance gain to a significant extent, thus resulting in defective white balance. Therefore, AWB control algorithms are required to adopt a technique that determines whether or not an input image is a single-tone image.

As for a known related art method of recognizing a single-tone image, the values of adjacent pixels are compared to one another with regard to the entirety of the RGB data of an input image and data about difference values between the adjacent pixels is accumulated, thus determining whether the input image is a single-tone image. This method, however, may impair system efficiency. Although capable of determining an ideal single-tone image through the comparison of adjacent pixels, this method is likely to cause errors at the final stage of determination if errors in the comparison between the adjacent pixels are accumulated continuously since color signals are concentrated around a specific area, not completely at the specific area. Moreover, comparing adjacent pixels to recognize a single-tone image may serve to prevent color distortion with regard to a single frame. However, this method fails to determine the transition from a composition image having the relatively uniform distribution of various colors to a single-tone image having the wide distribution of a single tone.

As for another known related art method of recognizing a single-tone image, assuming that the center of an image is an object area for camera capturing, the area of an outline determined to be an object in the corresponding area is determined and divided into blocks of a predetermined size, thus determining a single-tone image in due consideration of the level of dispersion and the mean value of brightness levels in the object area at the center of an image. This method, however, may increase system load due to the process of determining the area of an outline from the center of an image and dividing the area into blocks of a predetermined size. In the event that the assumption made regarding the object area is incorrect, this method may fail to acquire a desired result. Moreover, this method does not take into account the transition from a composite image to a single-tone image, thus it may result in erroneous results if such a transition takes place.

SUMMARY OF THE INVENTION

An aspect of the present invention provides an apparatus and method for auto white balance control, which can prevent erroneous white balance in an auto white balance control process in the case that a single-tone area is excessively present in the creation of a still image or a moving picture.

According to an aspect of the present invention, there is provided an apparatus for auto white balance control considering the effect of a single-tone image, including: a histogram generation unit writing respective histograms of Cb values and Cr values with regard to pixels included in an input image frame; a single-tone determination unit comparing respective maximum values of the histograms of Cb values and Cr values with a preset first threshold value, and determining the input image frame to be a single-tone image if at least one of the maximum values is higher than the first threshold value; and an auto white balance gain computation unit computing an auto white balance gain by using color information of an input image frame and outputting the computed auto white balance gain, wherein if the input image frame is determined to be a single-tone image by the single-tone determination unit, the auto white balance gain computation unit outputs an auto white balance gain computed with respect to a previous input image frame without computing an auto white balance gain with respect to the input image frame determined to be a single-tone image.

The apparatus may further include a target pixel removal determination unit grouping adjacent Cb values and adjacent Cr values having frequencies higher than a preset second threshold value in the histograms of Cb values and Cr values if the single-tone determination unit determines that the input image frame is not a single-tone image, and determining pixels, which belong to respective groups of the adjacent Cb values and the adjacent Cr values having smaller ranges than a preset reference range, to be excluded in an auto white balance control. The auto white balance gain computation unit may compute an auto white balance gain with respect to the input image frame by using pixels other than the pixels determined to be excluded in an auto white balance control.

The apparatus may further include a removal amount determination unit comparing the number of pixels determined to be excluded in an auto white balance control by the target pixel removal determination unit, with a preset third threshold value. If the number of pixels determined to be excluded in an auto white balance control is greater than the third threshold value, the auto white balance gain computation unit may output an auto white balance gain computed with respect to a previous input image without computing an auto white balance gain with respect to the corresponding input image frame.

According to another aspect of the present invention, there is provided a method for auto white balance control considering the effect of a single-tone image, the method including: writing respective histograms of Cb values and Cr values with regard to pixels included in an input image frame; comparing respective maximum values of the histograms of Cb values and Cr values with a preset first threshold value; and determining the input image frame to be a single-tone image if at least one of the maximum values is higher than the first threshold value, and performing an auto white balance control by using an auto white balance gain computed with respect to a previous input image frame without computing an auto white balance gain with respect to the input image frame determined to be a single-tone image.

BRIEF DESCRIPTION OF THE DRAWINGS

The patent or application file contains at least one drawing executed in color. Copies of this patent or patent application publication with color drawing (s) will be provided by the Office upon request and payment of the necessary fee.

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
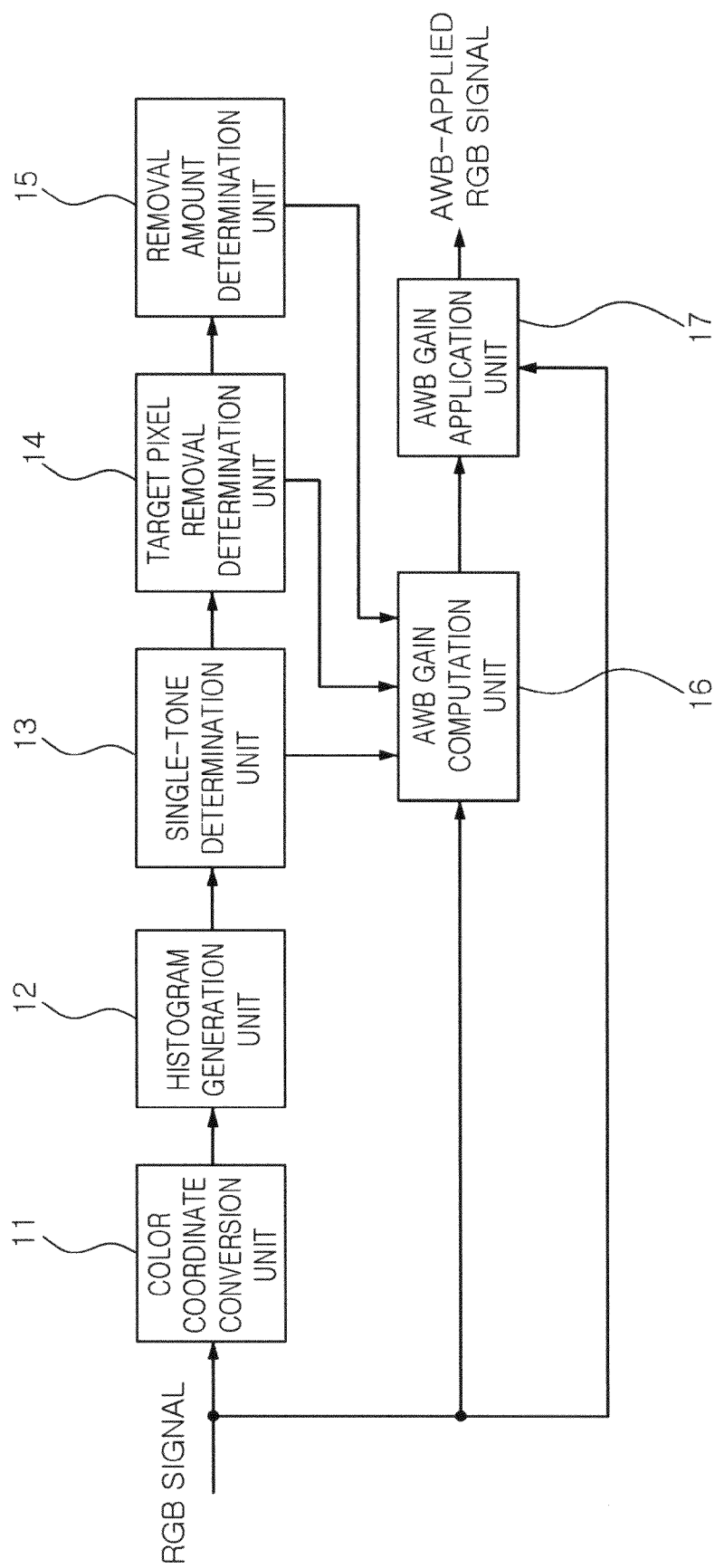
FIG. 1 is a block diagram depicting a white balance control apparatus according to an exemplary embodiment of the present invention.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity.

FIG. 1 is a block diagram of an apparatus for white balance control according to an exemplary embodiment of the present invention.

Referring to FIG. 1, the apparatus for white balance control, according to an exemplary embodiment of the present invention, may include a color coordinate conversion unit 11, a histogram generation unit 12, a single-tone determination unit 13, a target pixel removal determination unit 14, a removal-amount determination unit 15, an auto white balance (AWB) gain computation unit 16, and an AWB application unit 17.

The color coordinate conversion unit 11 converts an image frame represented by RGB color coordinates into YCbCr color coordinates. In general, a signal output by an image sensor as a result of image capturing may be in the form of a bayer pattern in which each pixel is expressed as one of R, G and B colors. By applying a color interpolation algorithm to an image frame output in the bayer pattern, the image frame is converted into RGB color coordinates by which each pixel is represented in RGB values. The color coordinate conversion unit 11, according to this embodiment, converts the RGB color coordinates of the image frame into YCbCr color coordinates.

The histogram generation unit 12 generates respective Cb and Cr histograms by use of the converted YCbCr color coordinates. That is, the histogram generation unit 12 recognizes the Cb and Cr values of each pixel of the input image frame, and generates a Cb histogram where an x-axis denotes Cb values and a y-axis denotes frequencies, and a Cr histogram where an x-axis denotes Cr values and a y-axis denotes frequencies.

The single-tone determination unit 13 compares a preset first threshold value with the maximum value, that is, the maximum frequency of each of the Cb and Cr histograms generated by the histogram generation unit 12. If at least one of the maximum values is higher than the first threshold value, the corresponding image frame is determined to be a single-tone image.

The target pixel removal determination unit 14 analyzes the Cb and Cr histograms, and determines whether or not the corresponding image frame is in transition from a composite image to a single-tone image. In order to prevent a single-tone area from affecting auto white balance, pixels in the single-tone area are determined so that the single-tone area can be excluded in computing an AWB gain. The target pixel removal determination unit 14 groups adjacent values among Cb values having frequencies higher than a preset second threshold value in the Cb histogram, and also groups adjacent values among Cr values having frequencies higher than the preset second threshold value in the Cr histogram. If the respective ranges of Cb and Cr values in resultant Cb and Cr groups are smaller than a preset reference range, pixels in corresponding groups are determined as belonging to a single-tone area, and an AWB gain may be computed by using pixels in the corresponding image frame, other than those pixels belonging to the corresponding groups.

The removal-amount determination unit 15 determines the number of pixels determined by the target pixel removal determination unit 14 to be excluded in computing an AWB gain. If it is determined that an excessive number of pixels will be excluded in the gain computation, the removal-amount determination unit 15 prevents a new AWB gain from being computed with respect to the current image frame.

The AWB gain computation unit 16 computes an AWB gain for changing a color value based on the color information of each pixel in the input image frame by using a variety of known techniques. The AWB gain computation unit 16 computes an AWB gain by using the color information of the input image frame. However, if the single-tone determination unit 13 has determined that the input image frame is a single-tone image, the AWB gain computation unit 16 may output an AWB gain computed with respect to a previous input image, without computing an AWB gain with respect to the current corresponding input image frame. The AWB gain computation unit 16 may compute an AWB gain using the color information of pixels other than the pixels determined by the target pixel removal determination unit 14 to be excluded in computing an AWB gain. If the number of pixels to be excluded by the target pixel removal determination unit is determined to be excessive by the removal-amount determination unit 15, the AWB gain computation unit 16 may output an AWB gain computed with respect to a previous input image frame, without computing an AWB gain with respect to the corresponding input image frame.

The AWB application unit 17 applies the AWB gain, output from the AWB gain computation unit 16 after being computed according to the color status of the input image frame, to the input image frame, thereby generating an image frame with controlled auto white balance The operation and effect of the apparatus for auto white balance control considering the effect of a single-tone image, which is configured as described above, according to an exemplary embodiment, will now be described in more detail with reference to accompanying drawings.

Figure 2:
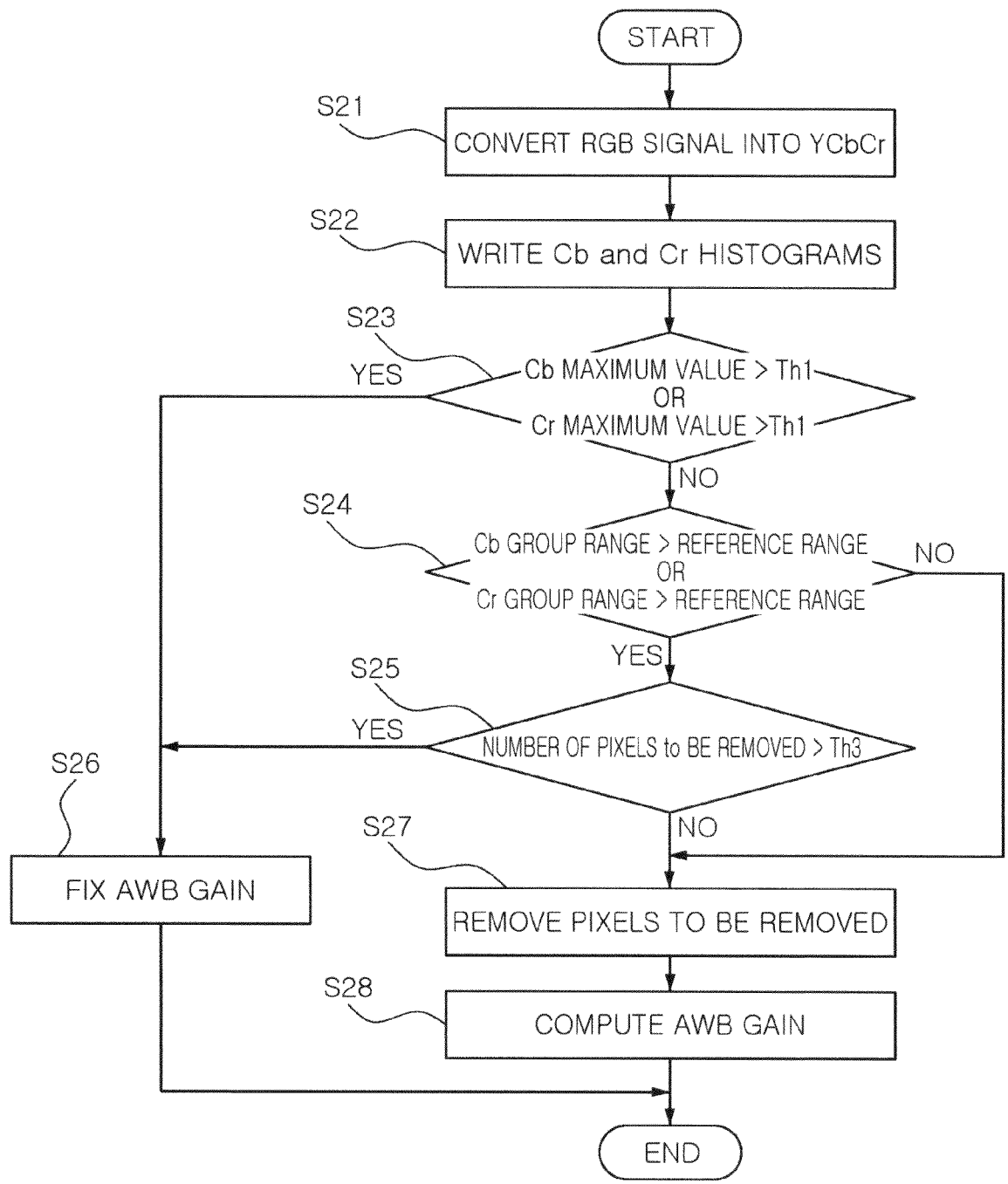
FIG. 2 is a flowchart showing a method for auto white balance control considering the effect of a single-tone image, according to an exemplary embodiment of the present invention.

FIG. 2 is a flowchart showing a method for auto white balance control considering the effect of a single-tone image, according to an exemplary embodiment of the present invention.

Referring to FIGS. 1 and 2, this embodiment may begin with converting an input image frame where each pixel is represented by RGB color coordinates, into YCbCr color coordinates in the color coordinate conversion unit 11 in operation S21.

Thereafter, the histogram generation unit 12 generates Cr and Cr histograms in order to take into account the color information of the input image frame in operation S22. Here, each of the Cb and Cr histograms is generated independently. Each of the Cb and Cr histograms has the x-axis range of 0 to 255, representing the range of possible Cb or Cr values within a single pixel. Each of the Cb and Cr histograms may be generated in due consideration of all of the values between 0 and 255, however this may increase system load. Therefore, the number of data groups for histogram analysis is rendered smaller than 256 by dividing values between 0 and 255 into groups of values by a predetermined range. As the magnitude of the value range of each group becomes smaller, the accuracy of the histogram improves while the complexity of a system increases. In contrast, as the magnitude of the value range of each group increases, the groups that need to be put into consideration decrease in number, thereby reducing system load; however, the accuracy of the histogram may be undermined. For example, if the magnitude of the value range of each group is set to four with respect to values between 0 to 255, a histogram may be generated with 64 groups of 0 to 3, 4 to 7, . . . , 248 to 251 and 252 to 255. The y-axis of the Cb histogram represents the frequencies of Cb values on the x-axis with regard to the entire pixels of an input image frame, and the y-axis of the Cr histogram also represents the frequencies of Cr values on the x-axis with regard to the entire pixels of the input image frame. In each Cb or Cr histogram, the frequencies of the y-axis may be expressed as the number of pixels having corresponding Cb or Cr values, or as normalized values ranging between 0 to 1 obtained by dividing the actual number of pixels by the total number of pixels. The Cb and Cr histograms generated in the above manner may teach how many pixels are distributed at Cb and Cr values with respect to the entire image.

Thereafter, the single-tone determination unit 13 analyzes the Cb and Cr histograms drawn with respect to the input image frame, to determine whether the input image frame is a single-tone image in operation S23.

Figure 3A:
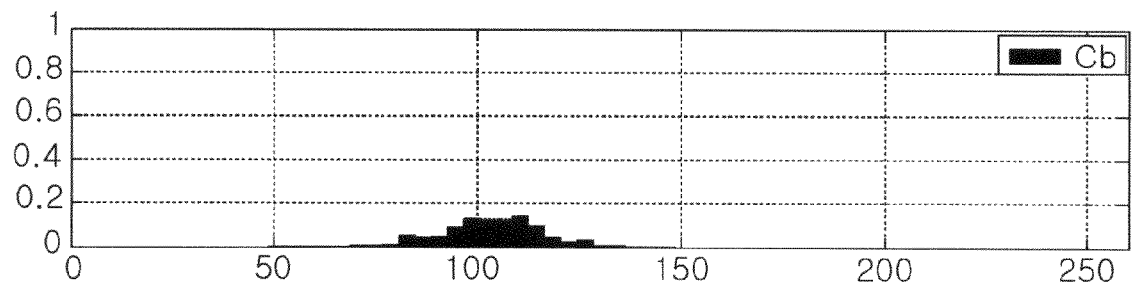
FIGS. 3A, 3B and 4A and 4B illustrate examples of Cb and Cr histograms according to an embodiment of the present invention.
Figure 3B:
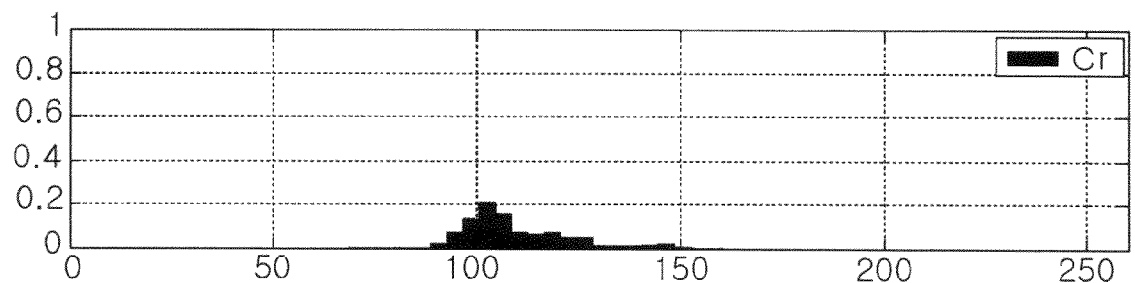
Figure 4A:
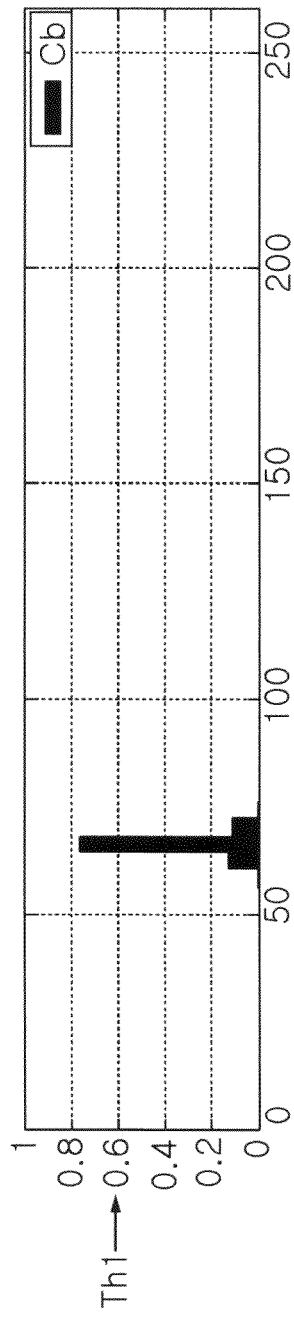
Figure 4B:
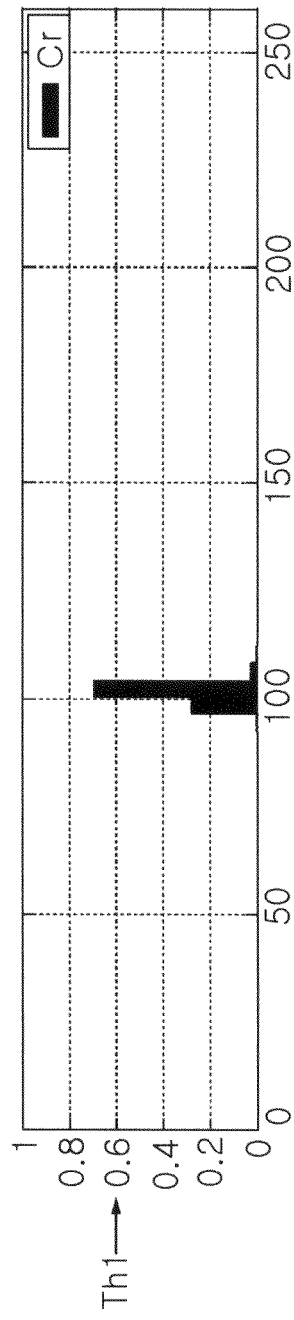

FIGS. 3A and 3B and 4A and 4B illustrate examples of Cb and Cr histograms generated according to an exemplary embodiment of the present invention. FIGS. 3A and 3B illustrate the histograms of a composite image in which a single-tone area is not widely distributed. FIGS. 4A and 4B illustrate the histograms of a single-tone image in which a single-tone area is widely distributed.

As shown in FIGS. 3A and 3B, in the Cb and Cr histograms of a composite image, Cb and Cr data are widely distributed due to the distribution of various colors throughout the entire image. Referring to FIGS. 3A and 3B, it can be seen that the respective maximum values of the y-axes, that is, the frequencies of the Cb and Cr histograms Cb are not high. In contrast, referring to FIGS. 4A and 4B, it can be seen that the distributions of the Cb and Cr histograms of a single-tone image are concentrated in a portion corresponding to a single tone, thereby increasing the number of pixels cumulatively counted, thus the respective maximum values of the Cb and Cr histograms are higher than those in the corresponding histograms of the composite image. Here, the single-tone image refers not just to an ideal monochromatic image having RGB values, each completely concentrated at one value, but also to various images input from an image sensor, including, for example, walls, single-color textiles or the like which may be considered a single-tone area. Therefore, in a single-tone image, RGB values are concentrated around a single value, rather than directly at the single value, due to the influence of the characteristics of the image sensor being used or the reflected light of the lighting. Therefore, according to the present invention, a single-tone image can also be determined in due consideration of the above characteristic of a single-tone image.

According to an exemplary embodiment of the present invention, a first threshold value Th1 is determined in advance through experiments using various images, by use of the aforementioned histogram characteristics of a composite image and a single-tone image. If the maximum values of the Cb and Cr histograms are lower than the first threshold value Th1, a corresponding image is determined to be a composite image and auto white balance is carried out in a normal manner. If the maximum values of the Cb and Cr histograms are higher than the first threshold value Th1, the image is determined to be a single-tone image, and an AWB gain generated with respect to a previous input image frame is applied to the corresponding image in operation S26, without generating a new AWB gain, so that discoloration of the single-tone image can be prevented. In the case of a general single-tone image, Cb and Cr histograms have similar forms. However, in some cases, a single-tone image may have dissimilar Cb and Cr histogram forms. For example, one of the Cb and Cr histograms may have a histogram form similar to that of a composite image and the other may have the histogram form of a single-tone image. With regard to the above occasion, according to the present invention, an image may be determined to be a single-tone image if just one of the respective maximum values of the Cb and Cr histograms exceeds the first threshold value Th1.

In the case of a still image, determining whether an input image frame is a single-tone image may serve to enhance the performance of auto white balance. However, in the case of a moving picture, multiple frames are displayed per a second. For this reason, even if a single frame is determined to be a single-tone image, color distortion may still occur due to the effect of a single-tone area occupying part of a composite image in transition from a composite image to a single-tone image or vice versa. When a single-tone image transitions to a composite image, color distortion does not occur to a significant extent because a new AWB gain is generated with respect to the composite image. However, when a composite image transitions to a single-tone image, a single-tone area occupying part of the composite image causes color distortion since an AWB gain is computed until the image is determined to be a single-tone image. That is, after the transition to a single-tone image, an AWB gain is not changed any longer due to the above single-tone image determination operation S23, and an AWB gain before the transition to the single-tone image is maintained, thereby maintaining a distorted color and thus preventing the discoloration of the single-tone image. However, the distorted color is also maintained undesirably. To overcome this limitation, an exemplary embodiment of the present invention provides a technique that prevents color distortion from occurring in the transition from a composite image to a single-tone image, in the case that a moving picture needs to be generated.

Figure 5:
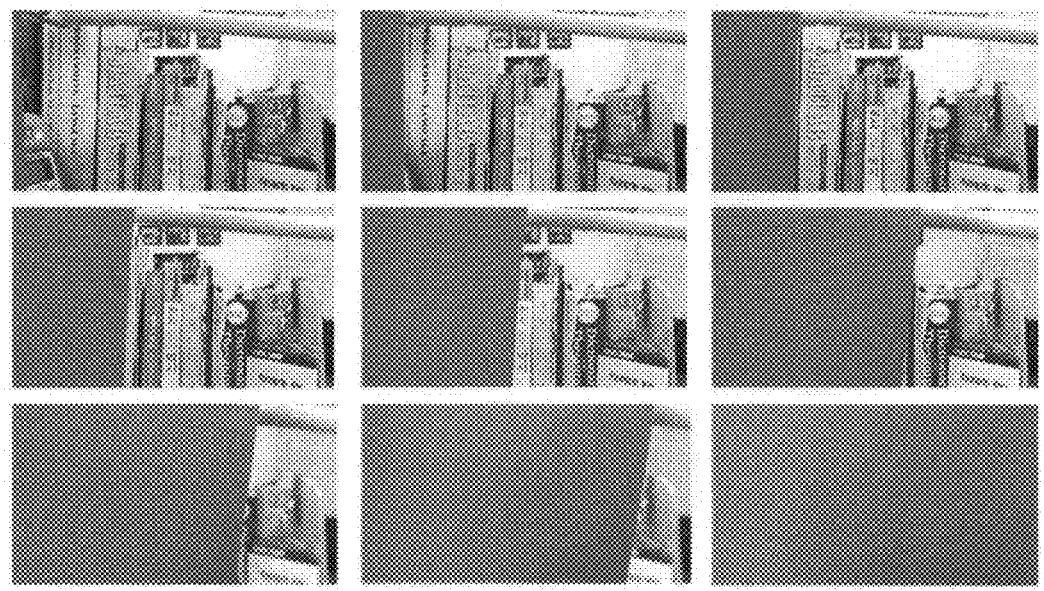
FIG. 5 is a view illustrating the frames of an image transitioning from a composite image to a single-tone image, at predetermined intervals.
Figure 6A:
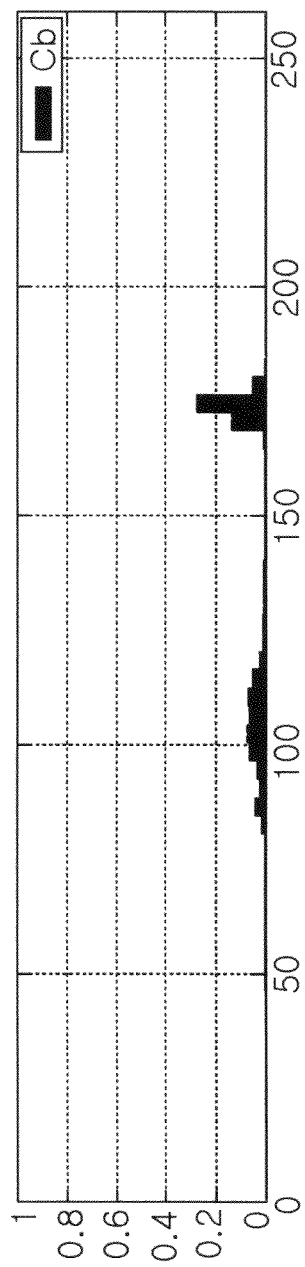
FIGS. 6A and 6B are the Cb and Cr histograms of some of the image frames of FIG. 5.
Figure 6B:
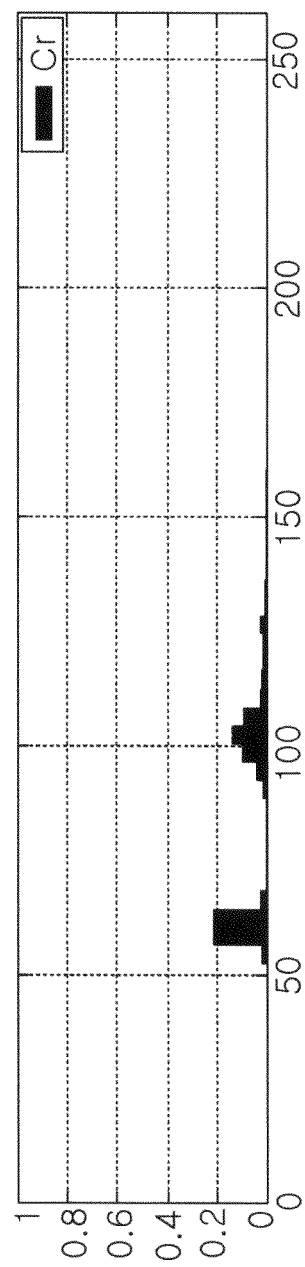

FIG. 5 illustrates image frames at a predetermined interval in an example image undergoing transition from a composite image to a single-tone image. FIGS. 6A and 6B illustrate the Cb and Cr histograms of some of the image frames of FIG. 5. As shown in FIGS. 5 and 6A and 6B, the Cb and Cr histograms have the characteristics of a composite image at an early stage and then show gradual increases in the frequencies in some regions of the histograms due to the effect of a single-tone area. It can be seen from FIGS. 5, 6A and 6B that after the single-tone area increases, histogram data generated by the initial composite image almost disappears, and then the histograms are constituted by data generated due to the single-tone area. Therefore, histogram data, the frequencies of which increase significantly in some regions of the histograms, may be considered to be affected by the effect of the single-tone area in transition from the composite image to the single-tone image. According to the determination result, the effect of a single-tone area may be removed from a composite image in transition, and an AWB gain may be computed by using the remaining data of the composite image, until the point when an image is determined to be a complete single-tone image.

Figure 7:
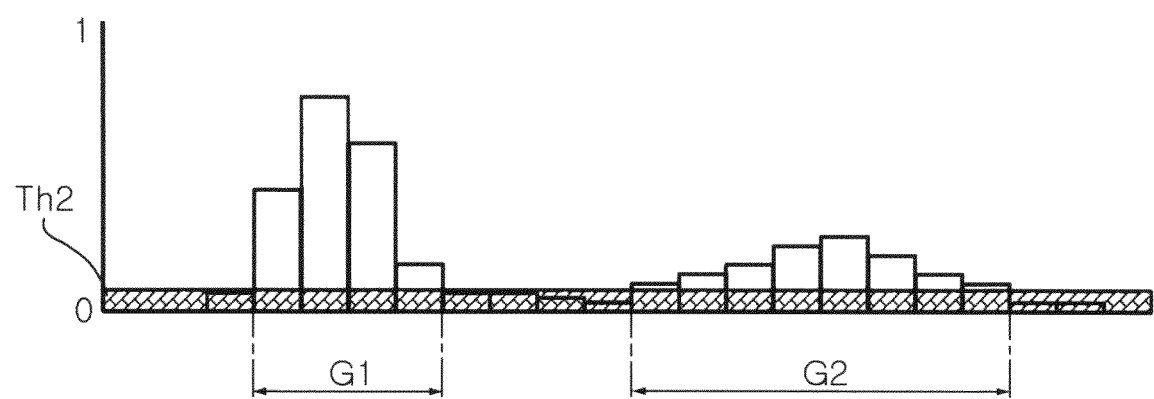
FIG. 7 is a histogram showing a transition from a composite image to a single-tone image.

In order to remove data generated due to the effect of the single-tone area, it is determined whether data groups represent a composite image or a single-tone image in due consideration of the data forms in a histogram with respect to an input image frame. To this end, according to the present invention, adjacent x-axis Cb values higher than a preset second threshold value Th2 in the Cb histogram, are grouped, and similarly, adjacent x-axis Cr values higher than the second threshold value Th2 in the Cr histogram, are also grouped. The respective ranges of the grouped Cb or Cr values (hereinafter, also referred to as Cb and Cr ranges) are compared to a preset reference range, and a group with a Cb or Cr range smaller than the preset reference range is determined to be in transition to a single-tone area in operation S24. Pixels belonging to the group determined to be in transition to a single-tone area are excluded in computing an AWB gain. FIG. 7 illustrates an example of a histogram reproducing the transition from a composite image to a single-tone image. In the histogram depicted in FIG. 7, a second group G2 has data distribution corresponding to a composite image, and a first group G1 has data distribution corresponding to a single tone area generated in transition from a composite image to a single-tone image. In general, despite the transition from a composite image to a single-tone image, groups are not formed with completely independent data. That is, even if data are divided into two groups as shown in FIG. 7, a small amount of data still remains between the two groups. Therefore, for a clear distinction between a histogram data group corresponding to a composite image and a histogram data group corresponding to a single-tone image, only the data having higher frequencies than the second threshold value Th2 are put into consideration, thereby removing the effect of low-value data formed between these two groups. To determine data corresponding to a single-tone area, the respective ranges of grouped Cb and Cr values on the x-axis are compared with a predetermined reference range. In general, the histogram data of a composite image is widely distributed due to diverse color information. The histogram data of a single-tone image, however, may be concentrated at one point due to its relatively unvaried color information. Accordingly, in a histogram having an x-axis range from 0 to 255, the data group of a composite image occupies a wider area on the x-axis than that of a single-tone image. Therefore, the reference range enabling the determination of a single-tone image is set in advance, and a group occupying a smaller x-axis area, that is, having a smaller Cb or Cr range than the preset reference range in the histogram is determined to be a group corresponding to a single-tone image. Thus, pixels belonging to this corresponding group are excluded in computing an AWB gain in operation S28. Thereafter, the AWB gain is computed in operation S28.

Figure 8:
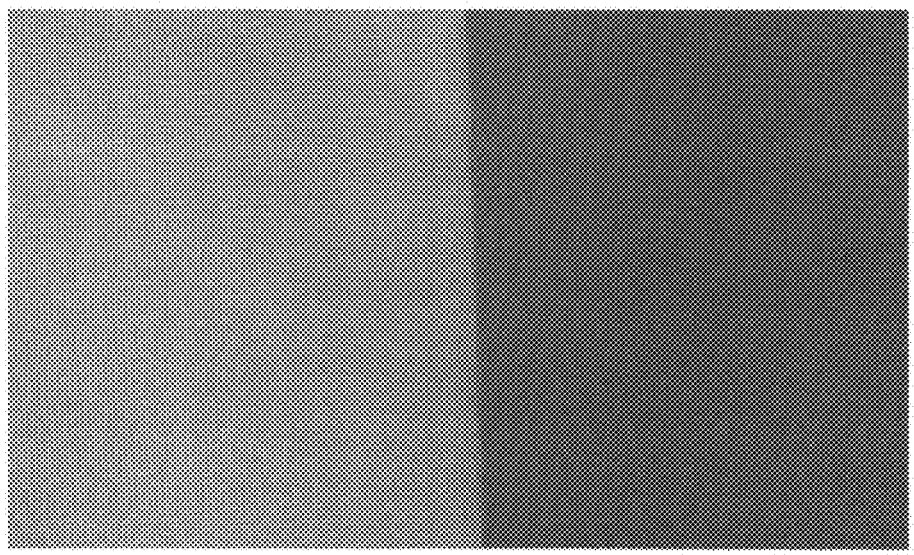
FIG. 8 illustrates an example of a single-tone image of two colors.
Figure 9A:
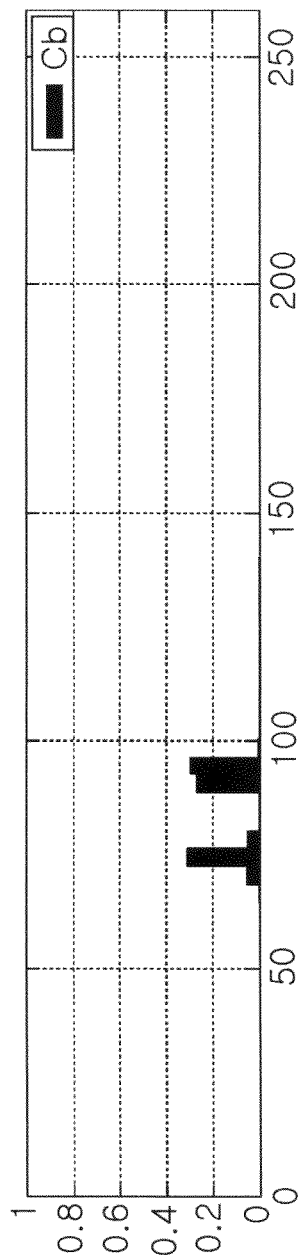
FIGS. 9A and 9B are the histograms of the single-tone image depicted in FIG. 8.
Figure 9B:
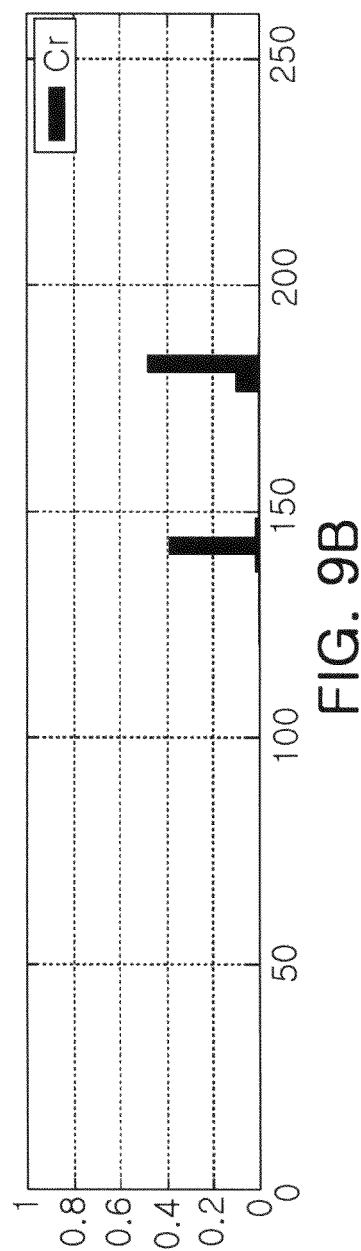

If the pixels belonging to the single-tone area are removed in computing the AWB gain as above, a sufficient number of pixels may not be used in computing a white balance gain. For example, as shown in FIG. 8, an image frame with more than one single-tone area may be input. In this case, histogram data are not determined to be a single-tone image in the single-tone determination operation S23 since the maximum value of the y-axis in the histogram is lower than the first threshold value Th1. Also, the histogram data satisfies the conditions of the operation S24 of determining pixels, which belong to a group corresponding to a single-tone area, to be removed in computing an AWB gain. This may cause most of pixels to be excluded in computing an AWB gain. If the AWB gain, computed in the above manner, is applied to an image, color distortion may increase or an undesired result may be obtained due to an insufficient number of pixels used in computing the AWB gain. To prevent such undesired occasion, in the case that histogram data under the effect of a single-tone area are removed, the amount of pixels to be excluded in computing an AWB gain is determined in operation S25. If the number of pixels to be excluded is greater than a preset third threshold value Th3, the input image is determined to have more than one single-tone area, and then an AWB gain obtained with respect to a previous input image frame is applied to the image without computing a new AWB gain, as in the case that an input image is determined to be a single-tone image. Accordingly, limitations can be prevented that may arise when an excessive number of pixels are excluded in the computation.

As set forth above, according to exemplary embodiments of the invention, in the process of auto white balance, erroneous white balance is prevented from occurring due to the excessive effect of a single-tone area contained in an image frame, so that images with natural color casts can be realized.

According to exemplary embodiment of the present invention, natural color casts can be implemented even in the case of a moving picture by excluding a single-tone area in transition from a composite image to a single-tone image, in computing an auto white balance (AWB) gain.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for auto white balance control considering an effect of a single-tone image, the apparatus comprising:
   a histogram generation unit configured to generate respective histograms of Cb values and Cr values with regard to pixels included in a current input image frame;
   a single-tone determination unit configured to compare respective maximum values of the histograms of Cb values and Cr values with a preset first threshold value and to determine whether the current input image frame is a single-tone image based on a result of comparison;
   an auto white balance gain computation unit configured to compute an auto white balance gain by using color information of the current input image frame and to output the computed auto white balance gain; and
   a target pixel removal determination unit configured to group adjacent Cb values and adjacent Cr values having frequencies higher than a preset second threshold value in the histograms of Cb values and Cr values if the single-tone determination unit determines that the current input image frame is not a single-tone image and to determine pixels, which belong to respective groups of the adjacent Cb values and the adjacent Cr values having smaller ranges than a preset reference range, to be excluded from an auto white balance control, wherein
   the single-tone determination unit is configured to determine that the current input image frame is a single-tone image if at least one of the maximum values is higher than the first threshold value,
   if the single-tone determination unit determines that the current input image frame is a single-tone image, the auto white balance gain computation unit is configured to output an auto white balance gain computed with respect to a previous input image frame without computing the auto white balance gain with respect to the current input image frame, and
   the auto white balance gain computation unit is configured to compute the auto white balance gain with respect to the current input image frame by using pixels other than the pixels determined to be excluded from the auto white balance control.

2. The apparatus of claim 1, further comprising a removal amount determination unit configured to compare a number of the pixels determined to be excluded from the auto white balance control by the target pixel removal determination unit, with a preset third threshold value, wherein if the number of the pixels determined to be excluded from the auto white balance control is greater than the third threshold value, the auto white balance gain computation unit is configured to output the auto white balance gain computed with respect to the previous input image frame without computing the auto white balance gain with respect to the current input image frame.

3. A method for auto white balance control considering an effect of a single-tone image, the method comprising:
   generating respective histograms of Cb values and Cr values with regard to pixels included in a current input image frame;
   comparing respective maximum values of the histograms of Cb values and Cr values with a preset first threshold value;
   determining whether the current input image frame is a single-tone image based on a result of comparison;
   performing an auto white balance control by using an auto white balance gain computed by using color information of the current input image frame and outputting the computed auto white balance gain;
   grouping adjacent Cb values and adjacent Cr values having frequencies higher than a preset second threshold value in the histograms of Cb values and Cr values if the current input image frame is determined not to be a single-tone image at the determining;
   comparing ranges of the adjacent Cb values and the adjacent Cr values in respective groups with a preset reference range;
   determining pixels, which belong to respective groups of the adjacent Cb values and the adjacent Cr values having smaller ranges than the preset reference range, to be excluded from an auto white balance control; and
   computing the auto white balance gain with respect to the current input image frame by using pixels other than the pixels determined to be excluded from the auto white balance control, wherein
   the current input image frame is determined to be a single-tone image if at least one of the maximum values is higher than the first threshold value, and
   if the current input image frame is determined to be a single-tone image, the performing includes outputting an auto white balance gain computed with respect to a previous input image frame without computing the auto white balance gain with respect to the current input image frame.

4. The method of claim 3, further comprising:
   comparing a number of the pixels determined to be excluded from the auto white balance control with a preset third threshold value; and
   outputting the auto white balance gain computed with respect to the previous input image frame without computing the auto white balance gain with respect to the current input image frame, if the number of the pixels determined to be excluded from the auto white balance control is greater than the third threshold value.

* * * * *